United States Patent [19]
Ostor

[11] Patent Number: 5,427,289
[45] Date of Patent: Jun. 27, 1995

[54] VEHICLE ATTACHED DEMOUNTABLE CARRIER

[76] Inventor: Pierre A. Ostor, 70 NE 63rd Way, Fridley, Minn. 55432

[21] Appl. No.: 179,328

[22] Filed: Jan. 10, 1994

[51] Int. Cl.⁶ .......................... B60R 9/052; B60R 9/06; B60R 9/08; B60R 9/10
[52] U.S. Cl. ................. 224/42.430; 224/282; 224/42.32; 414/462
[58] Field of Search ......... 224/282, 42.03 R, 42.03 A, 224/42.32, 42.03 B, 42.43, 42.41, 42.45 R; 414/462

[56] References Cited

U.S. PATENT DOCUMENTS

| | | | |
|---|---|---|---|
| 1,418,426 | 6/1922 | Born | 224/42.32 |
| 3,103,290 | 9/1963 | Perri | 414/462 |
| 3,724,694 | 4/1973 | Wilson | 414/462 |
| 4,646,952 | 3/1987 | Timmers | 224/42.03 R |
| 4,671,439 | 6/1987 | Groeneweg | 224/42.03 R |
| 4,775,282 | 10/1988 | Van Vliet | 224/42.43 |
| 4,815,638 | 3/1989 | Hutyra | 414/462 |
| 5,215,234 | 6/1993 | Pasley | 224/42.43 |

FOREIGN PATENT DOCUMENTS

| | | | |
|---|---|---|---|
| 1115670 | 1/1982 | Canada | 224/42.41 |
| 41889 | 12/1981 | European Pat. Off. | 224/42.03 B |
| 1580685 | 12/1980 | United Kingdom | 224/42.03 B |

Primary Examiner—Henry J. Recla
Assistant Examiner—Charles R. Eloshway
Attorney, Agent, or Firm—Leo Gregory

[57] ABSTRACT

A carrier particularly adapted for use with an automotive vehicle having limited cargo or carrying space which may be readily removably mounted upon the trailer hitch of such a vehicle having a width corresponding to that of the vehicle and being adapted to comprise a hinged tray or shelf which may be lowered to support and carry a load and the carrier may be put into a collapsed position by pivoting said shelf to be in a vertical out of the way position.

7 Claims, 4 Drawing Sheets

5,427,289

VEHICLE ATTACHED DEMOUNTABLE CARRIER

BACKGROUND OF THE INVENTION

1. Field of Invention

Relates to a collapsible demountable carrier to be mounted onto the trailer hitch of an automotive vehicle.

2. Description of the Previous Art

There are many types of self supporting trailers to be attached to the rear of a vehicle and adapted to be drawn. There are but few which are mounted secured as for attachment to the frame or body of the vehicle and are of a construction which is not readily collapsible.

SUMMARY OF THE INVENTION

It is a principal object herein to provide a carrier to be supported at the rear end of a vehicle.

It is a further object to provide a carrier particularly adapted to be removably mounted onto a trailer hitch of a vehicle.

It is another object herein to provide a collapsible carrier to be demountably attached to the rear of a vehicle, preferably removably mounted onto a trailer hitch thereof.

It is also an object herein to provide a carrier to be removably attached to a vehicle and which is readily attached thereto without any modification of the vehicle for attachment.

Another object herein is to provide a carrier to be readily detachably mounted onto the trailer hitch of a vehicle and which for convenience may be collapsed when not engaged in supporting or carrying a load.

These and other objects and advantages of the invention herein will be set forth in the following description made in connection with the accompanying drawings in which like reference characters refer to similar parts throughout the several views.

DESCRIPTION OF A PREFERRED EMBODIMENT

Figure 1:
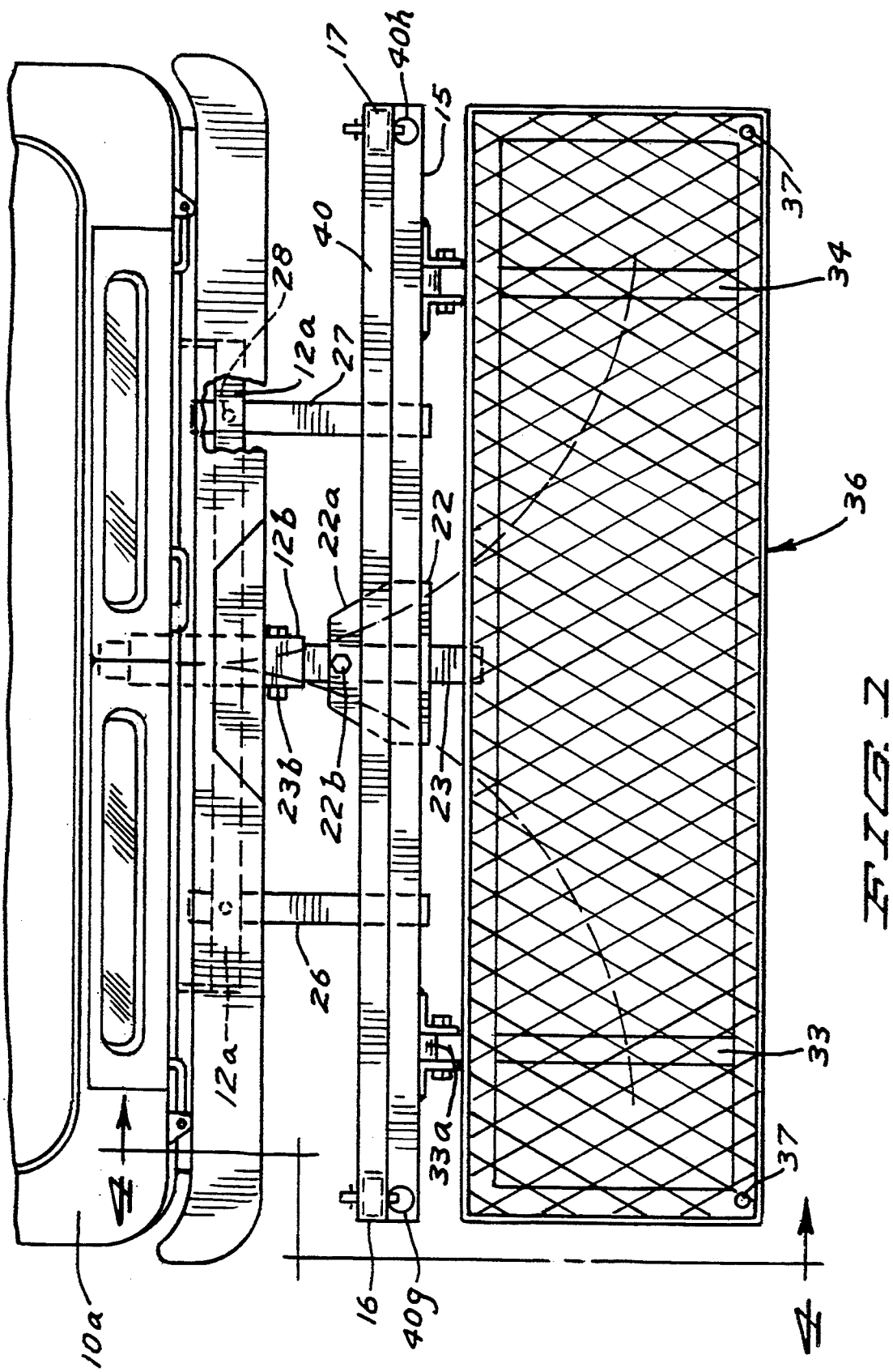
FIG. 1 is a top plan view of the structure herein shown attached to a broken away portion of a vehicle.
Figure 2:
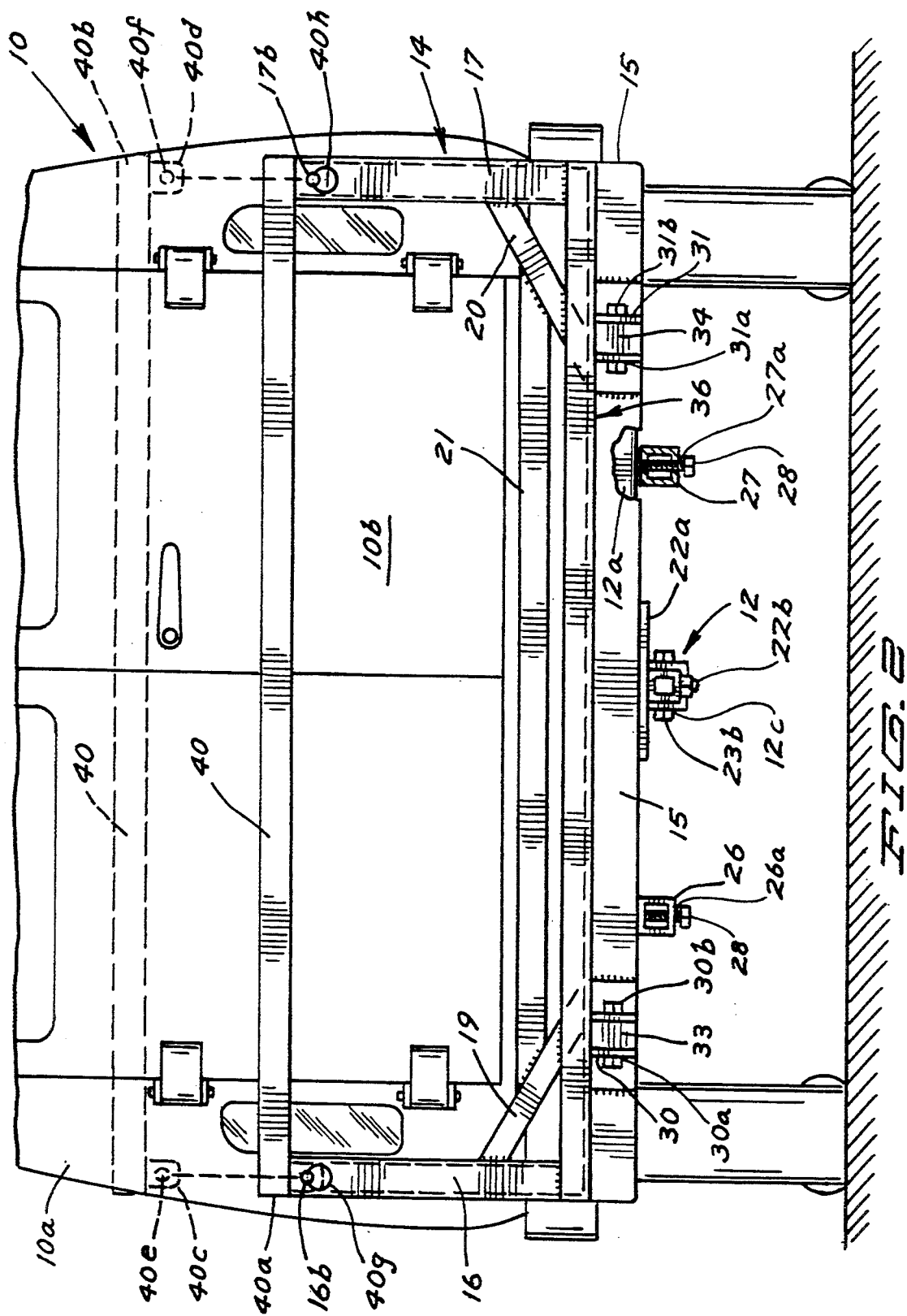
FIG. 2 is a view in elevation showing the structure herein in retracted position mounted on the rear of the vehicle.

Referring now to the drawings and more particularly to FIG. 2, shown is the rearward end portion 10a of a vehicle 10 as of a van or truck type of vehicle of limited cargo space and having secured thereto a conventional trailer hitch 12. As indicated, said trailer hitch extends somewhat rearwardly of said vehicle having mounted thereon and removably secured thereto a carrier 14 comprising the product of the invention herein.

Prior to a description of it being mounted, a description of the carrier as it is made up is given.

Figure 3:
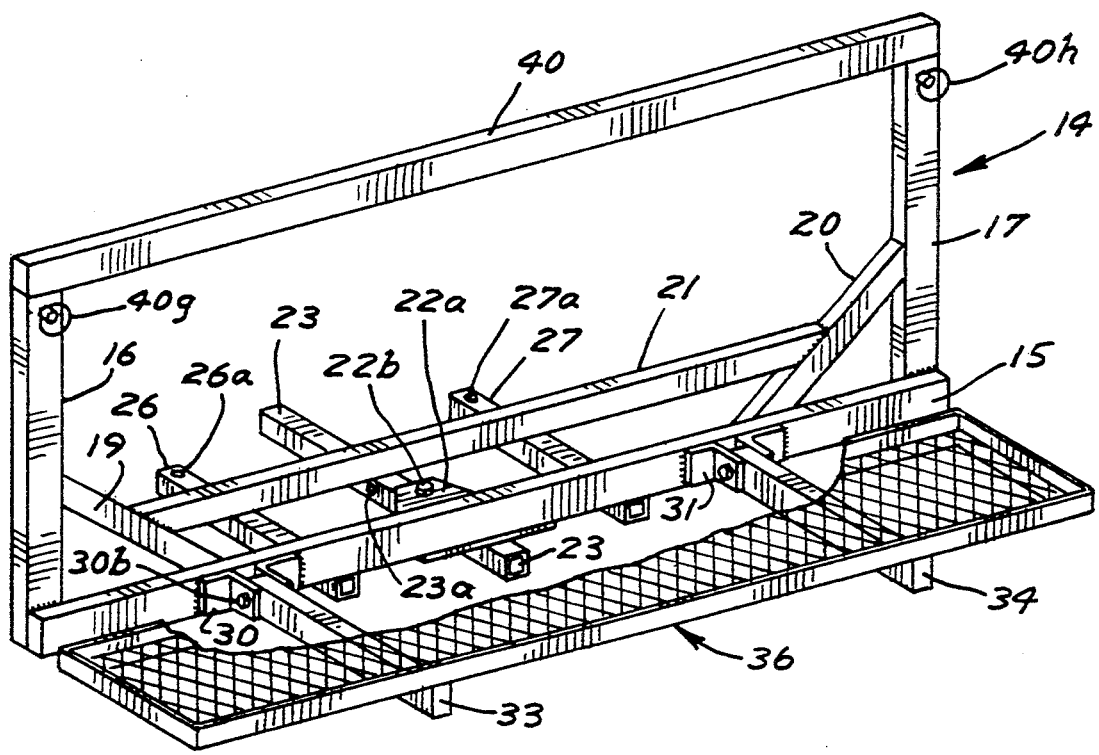
FIG. 3 is a view in perspective of the structure herein.
Figure 4:
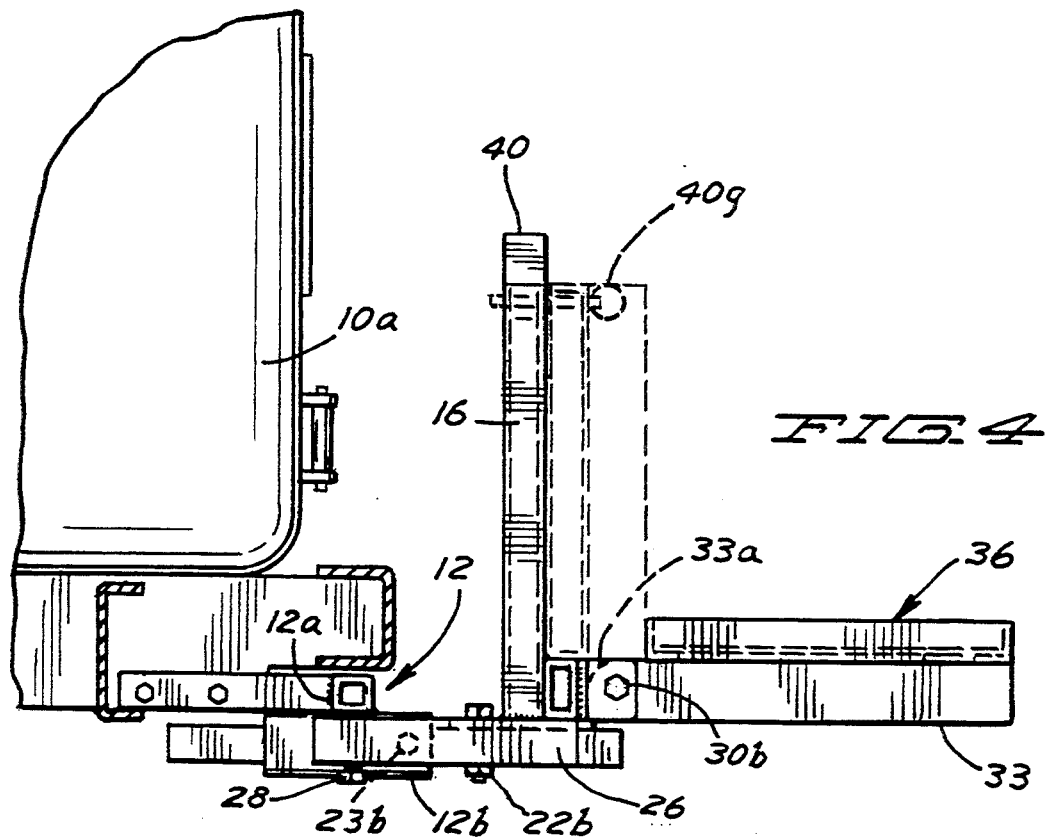
FIG. 4 is a view in end elevation taken on line 4—4 of FIG. 1 as indicated.

Referring to FIG. 3, said carrier 14 has as its principal structural element a metal cross or transverse tubular frame member 15 shown here to be rectangular in cross section having upstanding respectively from each end thereof vertical tubular members or posts 16 and 17 secured thereto to the far side thereof, as seen in FIG. 2, as by welding.

All of the tubular members or bars or posts as shown herein are preferably rectangular in cross section.

Said posts 16 and 17 are secured to said cross member by welded angled brace members 19 and 20. Extending between and secured as by welding to said brace members is a horizontal cross member 21 at a somewhat higher level than said cross member 15.

Underlying and secured as by welding to said cross member 15 centrally thereof is a plate member 22 which has a tapered portion 22a extending rearwardly as in the direction toward said vehicle.

An elongated bar or tubular member 23 underlies and is bolted by bolt 22b to said plate member, and it extends rearwardly in the direction of the rear of said vehicle extending to and is received into an extended tubular portion 12b of the trailer hitch 12 and is apertured at 23a at its inner end portion to receive a horizontal pin 23b which extends through an aperture 12c aligned therewith through said hitch extension.

Spaced at either side from said bar 23 and parallel thereto are stabilizer bars 26 and 27, the same being secured as by welding to the underside of said transverse frame member 15 and have vertical threaded apertures at their inner end portions as at 26a and 27a. These bars by engagement of bolts 28 to the underside of a cross bar 12a of said trailer hitch remove all play and relative movement therebetween.

Hinges or pivot members 30 and 31 are formed of angle members as shown respectively spaced inwardly from each end of said frame member 15 being welded to the facing surface of said frame member as seen in FIG. 2 and hingedly secured to said pivot members by pins 30b and 31b extending through apertures 30a and 31a are rearwardly or outwardly extending supporting bars 33 and 34. Said bars have a radius or curvature at their upper end portions as at 33a to swing upwardly 90° but are prevented from swinging downwardly by engagement of the lower end portions thereof butting against or engaging the adjacent facing wall portion of said frame member 15. This is a conventional arrangement.

A tray 36 rectangular in plan and coextensive with said frame member 15 rests upon and is secured as by welding to the upper sides of said supporting bars 33 and 34 to be integral therewith. The same are thus made unitary and are adapted to be pivoted upwardly 90° with said supporting bars when not in use. Thus a tray is formed and is formed of a suitable material. When in vertical position, said tray is secured through its apertures 37 by pins 40g and 40h extending through the posts 16 and 17.

Extending between the upper open ends, not shown, of said posts 16 and 17 is an elevated transverse bar or cross member 40 referred to as a locking bar which has at its ends 40a and 40b respectively downward tapered channel projections 40c and 40d which are received into said upper open ends of said posts 16 and 17 and said projections respectively have horizontal apertures 40e and 40f aligned with the apertures 16b and 17b through which respectively extend pins 40g and 40h. Said pins are conventional self securing pins readily and easily removed for the removal of the bar 40.

It is noted here that said carrier extends crosswise of said vehicle the width of the same. The carrier as mounted is somewhat below the bottom edge of the rear door or doors 10b of the vehicle and when said bar 40 is removed, the said door or doors of the vehicle are unobstructed and are readily opened.

Thus it is seen that I have provided a tray which is readily positioned horizontally to become in fact a carrier for general purposes.

Figure 5:
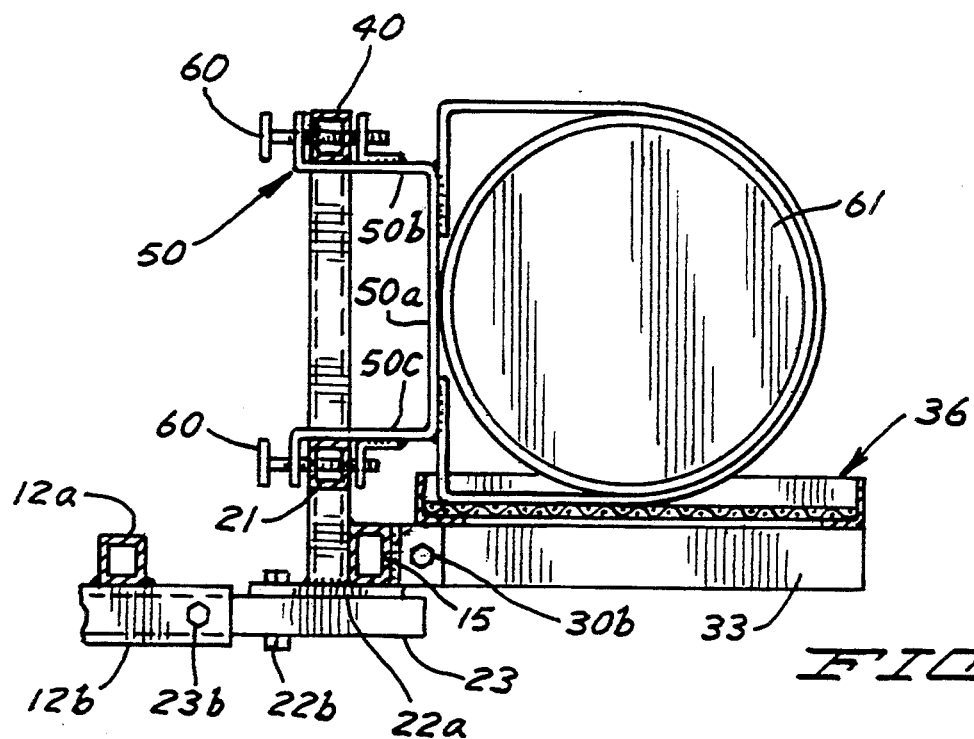
FIG. 5 is a broken view in end elevation showing a detail of attachment structure on a vertical section of support.

As shown in FIG. 5, a bracket 50 is adapted to be removably secured to the cross members or bars 21 and 40, said bracket having a front wall 50a having upper and lower extending channel portions 50b and 50c which receive therein adjacent portions of the cross members 21 and 40, said bracket having an appropriate length or spaced portions as may be desired and the engaging portions are appropriately apertured as illustrated to receive the self securing pins 60 to removably secure the same. This bracket may have secured thereto a conventional cylinder or other container integral with said bracket.

Figure 6:
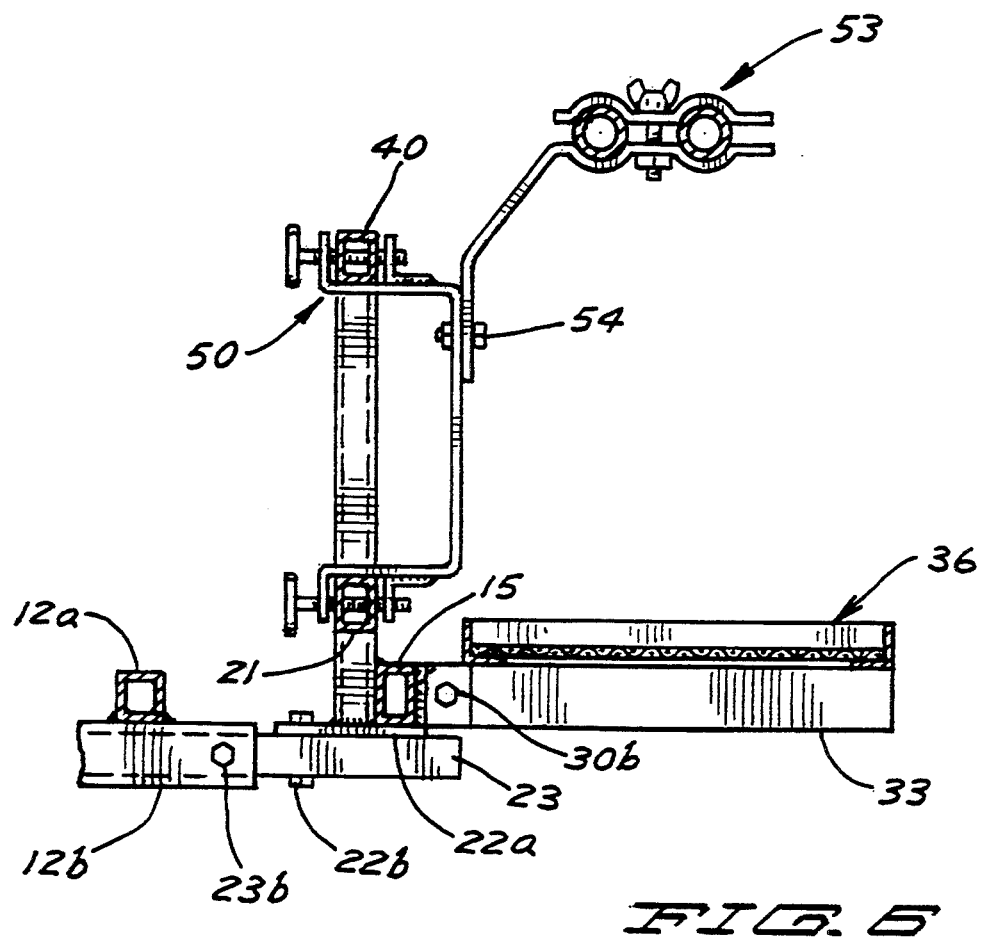
FIG. 6 is a view similar to that of FIG. 5 showing another detail of attachment structure.

In FIG. 6 said bracket 50 is shown having a clamp bracket 53 of a conventional design secured thereto as by a bolt 54 thorugh an appropriate aperture to secure in carrying position, for example, a bicycle.

It will of course be understood that various changes may be made in the form, details, arrangement and proportions of the invention herein without departing from the scope of the invention which, generally stated, consists in a product capable of carrying out the objects above set forth, such as disclosed and defined in the appended claims.

What is claimed is:

1. A carrier mountable onto a trailer hitch of an automotive vehicle, having in combination
   a principal frame member defining for a width and having two opposed ends,
   an upstanding bar connected to at each end of said frame member,
   bracing members securing said upstanding bars to said frame member,
   a bar member and extending between said bracing members secured thereto and being located above said frame member,
   a first plate member underlying said frame member and secured thereto centrally thereof,
   an attachment bar member underlying and secured to said first plate member and extending horizontally therefrom for attachment to a trailer hitch of an automotive vehicle,
   a pair of spaced stabilizer bars underlying and secured to said frame member and adapted to adjustably engage an underside of a cross bar associated with said trailer hitch to provide lateral stability for said carrier relative to said trailer hitch,
   a supporting bar spaced inwardly of each end of said frame member,
   means for pivotally connecting said supporting bars to said frame member and allowing said supporting bars to be extended horizontally and permitting rotation of said supporting bars 90° to a vertical position,
   a second plate member having a width substantially that of said frame member, said second plate member overlying said supporting bars and being secured thereto,
   a transverse member extending between said upstanding bars, and
   means for releasably securing said transverse member to said upstanding bars to permit removal of said transverse member and permit the opening of a rear door associated with said automotive vehicle.

2. The structure of claim 1, wherein
   said transverse member being located above said bar member,
   a bracket releasably secured to said transverse member and said bar member centrally thereof, and
   said bracket arranged and adapted to secure a container thereto.

3. The structure of claim 1, wherein
   said transverse member being located above said second bar member, and
   a holding bracket being removably secured between said transverse member and said bar member.

4. A carrier mountable onto a trailer hitch of an automotive vehicle, having in combination
   a frame member which extends transversely to said trailer hitch, said frame member having opposed ends,
   an upstanding bar at each end of said frame member,
   means securing said upstanding bars to said frame member,
   a horizontal bar supported by said means securing said bars and located above said frame member,
   trailer hitch attaching means underlying and secured to said frame member centrally thereof,
   a pair of spaced bars secured to an underside of said frame member and extending to perpendicularly therefrom for engagement to an underside of a cross bar associated with said trailer hitch of said vehicle,
   means carried by said spaced bars for permitting adjustable engagement of said spaced bars with said cross bar in order to eliminate relative motion therebetween,
   a supporting bar spaced inwardly from each end of said frame member,
   means for pivotally securing said supporting bars to said frame member said means being adapted to support said supporting bars in a horizontal position and permit rotation to a vertical position,
   a tray member secured to and overlying said supporting bars, and
   a transverse bar having two opposed ends and extending between and releasably secured to said upstanding bars.

5. The structure of claim 4, wherein
   said trailer hitch attaching means comprises an attachment bar member extending to perpendicularly from said frame member for engagement with said trailer hitch,
   said attachment bar member having an apertured end portion adapted to engage and received within a corresponding apertured bar end portion of said trailer hitch with an alignment of the apertures thereof, and
   a self locking pin adapted to be disposed through said aligned apertures.

6. The structure of claim 4, wherein
   said means for pivotally supporting comprises,
   a pair of angled brackets,
   said brackets being horizontally spaced with a flange portion of each bracket facing a like flange of the other bracket, said facing flange portions having aligned apertures, said supporting bars each having an end portion respectively disposed between said facing flange portions of a pair of said brackets and having apertures in alignment with said aligned apertures in said spaced apart facing portions, and releasable securing means disposed through said aligned apertures for connecting one of said supporting bars to a respective pair of brackets.

7. The structure of claim 4, wherein said transverse bar has tapered projections connected at each end thereof, said upstanding bars each having open top ends, said projections being respectively disposed into said open top ends of said upstanding bars, aligned apertures extending respectively through said open top portions of said bars and through said projections when disposed therein, and releasable pins respectively disposed through said aligned apertures.

* * * * *